Dec. 28, 1965 W. J. FITZGERALD 3,226,534

SUPERCONDUCTIVE ADDER AND CORRELATOR

Filed Dec. 7, 1961 3 Sheets-Sheet 1

INVENTOR
WILLIAM J. FITZGERALD
BY George Baron
ATTORNEY

Dec. 28, 1965 W. J. FITZGERALD 3,226,534

SUPERCONDUCTIVE ADDER AND CORRELATOR

Filed Dec. 7, 1961

3 Sheets-Sheet 3

United States Patent Office 3,226,534
Patented Dec. 28, 1965

3,226,534

SUPERCONDUCTIVE ADDER AND CORRELATOR

William J. Fitzgerald, Walnut Creek, Calif., assignor to International Business Machines Corporation, New York, N.Y., a corporation of New York Filed Dec. 7, 1961, Ser. No. 157,636
7 Claims. (Cl. 235—173)

This invention relates to adder circuits, and more particularly to an adder circuit employing superconductive elements.

Superconductive elements employed as gating devices are discussed and described in the Buck Patent 2,832,897 which issued April 29, 1958. In that patent, a basic gating element comprises a tantalum wire around which is wound a tight coil of niobium. The coil is a control element and the wire is a gate element. Both the control winding and gate element are maintained in a bath at a temperature near absolute zero. Current traversing the gate wire will experience no resistance at such temperature. Resistance is inserted in the gate wire by sending a current through the control winding, which current creates a magnetic field sufficient to drive the gate from its super-conducting state to its resistive state.

The present invention employs superconductive gating elements to obtain an adder circuit. The adder will comprise two parallel paths wherein the left path contains superconductive gating elements wherein resistance can be switched into one path of the parallel path and the other path will have associated therewith a series of AND circuits which are conditioned by the current in the second path. Such AND circuits, in turn, condition flip-flops. The AND circuits are conditioned by staggered time pulses. The outputs of the flip-flops will generate a count indicative of a number of units of resistance switched into the first circuit. The manner of switching in resistances is immaterial to the invention, but one embodiment to be described herein will comprise control windings that measure the degree of correlation between two parallel arrays of signals. The present invention is in a sense an analog units counter. The counter counts the number of units of resistance inserted into the left path of two parallel paths. When such units of resistance appear in the left path, ccrrent which has been flowing through such left path will be switched into the right path. The time it takes such current to switch from the left path to the right path is governed by the time constant of the switching circuit, such time constant being inversely proportional to the number of units of resistance switched in. It is this feature which is employed to obtain a novel adder circuit.

Consequently, it is an object of this invention to obtain a novel counter circuit employing superconductive elements.

It is a further object to obtain an adder circuit that is particularly adapted for determining the degree of correlation between two complex signals appearing on parallel input lines.

It is a further object to obtain a cryogenic adder circuit that operates at high speeds yet is exceedingly small in size.

The foregoing and other objects, features and advantages of the invention will be apparent from the following more particular description of a preferred embodiment of the invention, as illustrated in the accompanying drawings.

Figure 1:
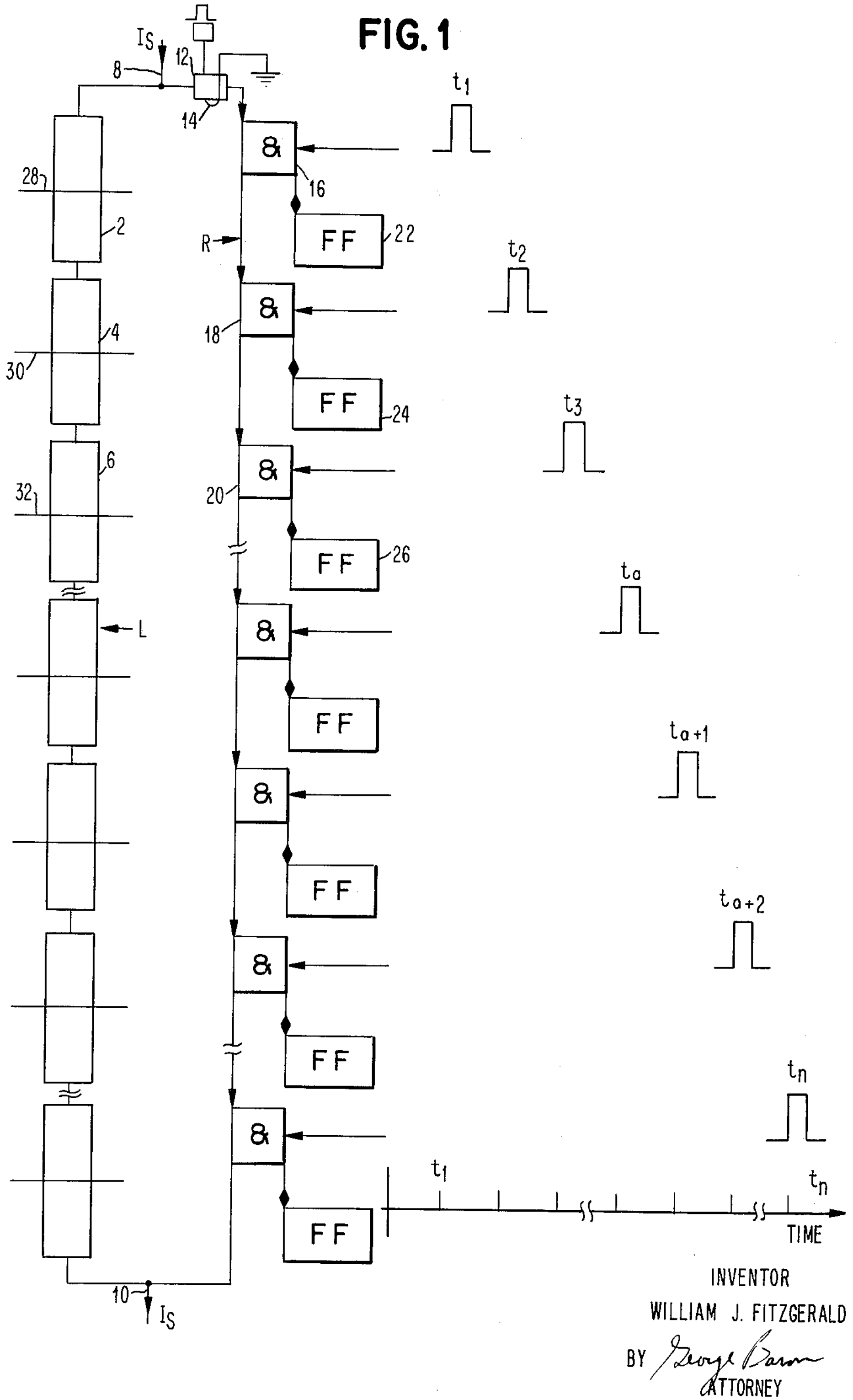
FIGURE 1 is a schematic diagram of the adder circuit of the present invention.

Turning to FIGURE 1, there are shown cryogenic gates 2, 4, 6, etc. that are in series with one another in the left branch L of a parallel path which includes a right branch R. Current $I_s$ appears at input terminal 8 and divides between the left path L and right path R according to the impedances of said paths, then exits at output terminal 10. Gate 12 is placed in the right path R and is driven resistive by passing current through control winding 14 affecting gate 12 so that initially the entire current $I_s$ can be made to flow through left path L. In the right path R are placed AND circuits 16, 18, 20, etc., which AND circuits are each actuated by the simultaneous presence of current flowing in path R and timing pulses *t1*, *t2*, *t3*, etc. The outputs, if any, of an AND circuit conditions a flip-flop. Flip-flop 22 is associated with AND circuit 16, flip-flop 24 with AND circuit 18, flip-flop 26 with AND circuit 20, etc. Lines 28, 30, 32, etc. are respectively the control lines for gates 2, 4 and 6. It is understood that the flip-flops could be replaced with any device that indicates that an AND circuit has produced an output signal.

Initially all of the current $I_s$ is caused to flow through the path L by sending a current pulse through control winding 14 making gate 12 resistive. The property of superconductivity is such that the total current $I_s$ will traverse the superconductive path L when gate 12 is resistive and remain in such path even when gate 12 returns to its superconductive state. When current appears as an input on any of the control lines 28, 30, 32, etc., such control lines drive their associated gates 2, 4 and 6 etc. resistive. At such times, current $I_s$ transfers out of the path containing the input circuits and builds up in the other path R, the speed of transfer of current being inversely proportional to the amount of resistance inserted in the first path.

Figure 2:
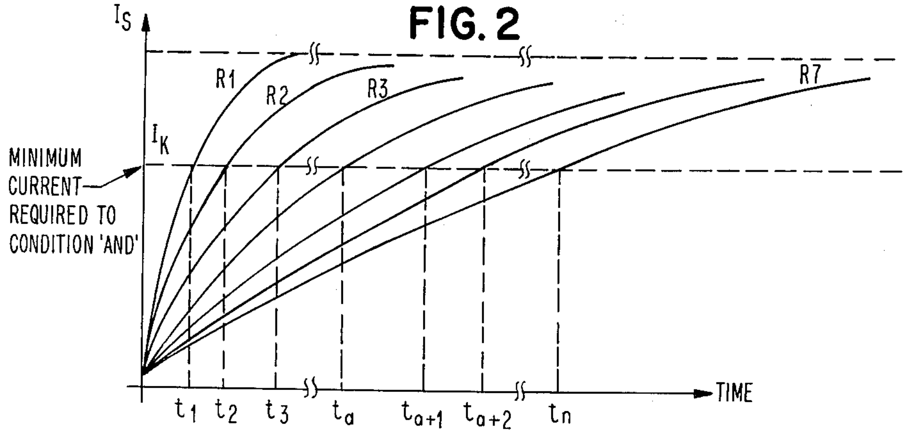
FIGURE 2 is a current versus time diagram that illustrates the operation of the embodiment of the invention shown in FIGURE 1.

Turning to FIGURE 2, there is shown how the current builds up in the second path as a function of the resistance inserted in the first path. $R_1$ relates to a curve indicating the insertion of a good deal of resistance in the first path L whereas $R_7$ indicates the insertion of relatively little resistance into the first path L. $I_k$ is chosen as the minimum amplitude of current required to actuate one of the AND circuits 16, 18, etc. The AND circuits are pulsed by staggered pulses *t1*, *t2*, etc. Assuming that a large amount of resistance $R_1$ has been inserted in the first path L because many cryotrons have been dirven resistive, flip-flop 22 will be set by the first staggered pulse *t1*. If a smaller amount of resistance, such as R2 or R3, has been inserted, flip-flop 22 will not be set but some subsequent flip-flops such as flip-flops 24, 26, etc. will be set. The sensing of a set flip-flop or flip-flops will be indicative of the number of inputs inserted into the first path L. By increasing the number of staggered pulses and AND circuits one may increase the precision for measuring the number of inputs in path L. The circuit can be calibrated so that the setting of certain flip-flops corresponds to a given number of cryotrons that are driven resistive in the first path.

Assume that it is desired to measure the degree of correlation between two complex signals appearing on parallel path lines wherein each line carries one or the other signal at a specific time increment. Correlation may be defined as the product of a function by another function over a period of time. The products are computed by equality or anti-equality function generators. Equality or anti-equality function generators can be obtained by employing two control windings for each superconductive gate.

Figure 3:
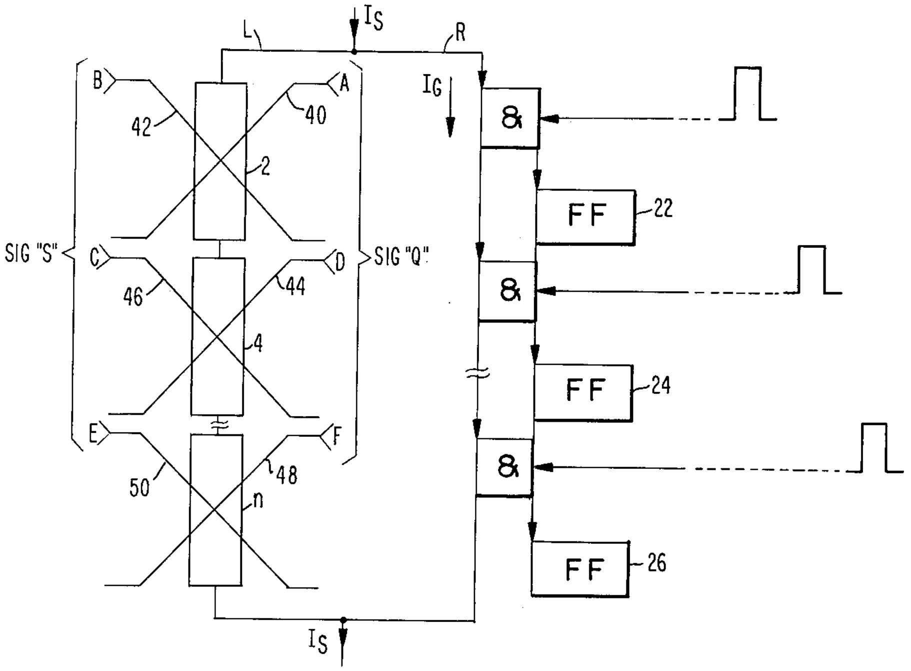
FIGURE 3 is a showing of the invention employed as a correlator of electronic signals.

Turning to FIGURE 3, each gate 2, 4, etc. has associated therewith two control lines. For example, gate 2 has associated therewith control lines 40 and 42, gate 4 has associated therewith control lines 44 and 46, whereas the last gate *n* has associated therewith control lines 48 and 50.

Figure 4:
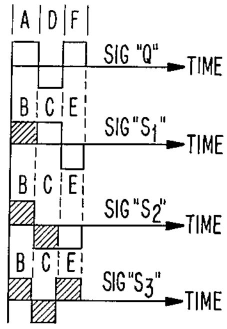
FIGURES 4 and 5 are current versus time diagrams to be used as an aid in understanding the operation of FIGURE 3.

FIGURE 3, in conjunction with FIGURE 4, depicts the use of the invention as a means for measuring the degree of correlation between two complex signals. Suppose we are trying to correlate signal Q with signal $S_1$. Notice that the first corresponding portions A and B, of signals Q and $S_1$ correlate. The A portion of signal Q appears on input control line 40 and the B portion of signal $S_1$ appears on input control line 42. Control lines 40 and 42 may be wound so that two equal positive or negative amplitudes A and B will maintain its associated gate 2 superconductive whereas two equal but opposite amplitudes A and B will drive its associated gate 2 into the resistive state. If desired, one may wind the control input lines 40 and 42 so that the reverse takes place, namely, that equal polarity amplitudes will drive a given gate resistive, but equal but opposite polarity amplitudes maintain a given gate in the superconductive state. Control line 44 accepts the D portion of signal Q and control line 48 accepts the F portion of signal Q. The C and E portions of signal $S_1$ appear respectively at input control lines 46 and 50.

It is seen that the first corresponding portions, A and B, of signals Q and $S_1$ correlate, but that the second and third signal portions, D and C, and F and E, do not correlate. The first corresponding portions, A and B, of signal $S_1$ and signal Q appear on lines 40 and 42, respectively. Correlation is indicated by the shaded area on the graph of $S_1$. However, the signals D and C on lines 44 and 46 are of opposite polarity and there is no correlation. In a similar manner, there is no correlation when control lines 48 and 50 are carrying their respective portions of signals Q and $S_1$.

Since A and B produce correlation, gate 2 remains super-conductive, but gates 4 and *n* are driven resistive. Therefore, the time it takes current $I_s$ to build up the right path R is indicated by a curve such as curve $S_1$ of FIGURE 5. Such amount of resistance would be indicated by the setting of a predetermined number of flip-flops 22 and 24.

In comparing signal Q with signal $S_2$, there are two time periods that correlate, so only one unit of resistance will be switched into the left path L and switching to the right path R will take place at a slower time. This slower switching will be indicated by having more than one flip-flop 24, 26, etc. set by a staggered timing pulse. A comparison of signal Q with signal $S_3$ shows complete correlation so that no units of resistance will be switched into the left path L, and the resultant failure of any flip-flops 22, 24, 26, etc. to be set after the termination of staggered pulses $t_1$ to $t_n$, is indicative of very high correlation. Curve $S_3$ of FIGURE 5 indicates such condition of high correlation whereas curve $S_1$ indicates low correlation.

Figure 5:
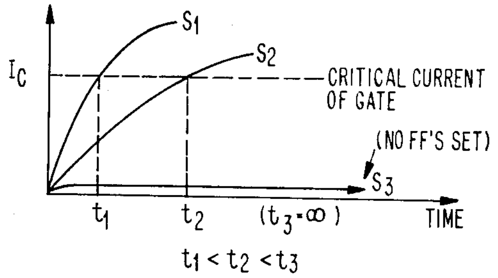
Figure 6:
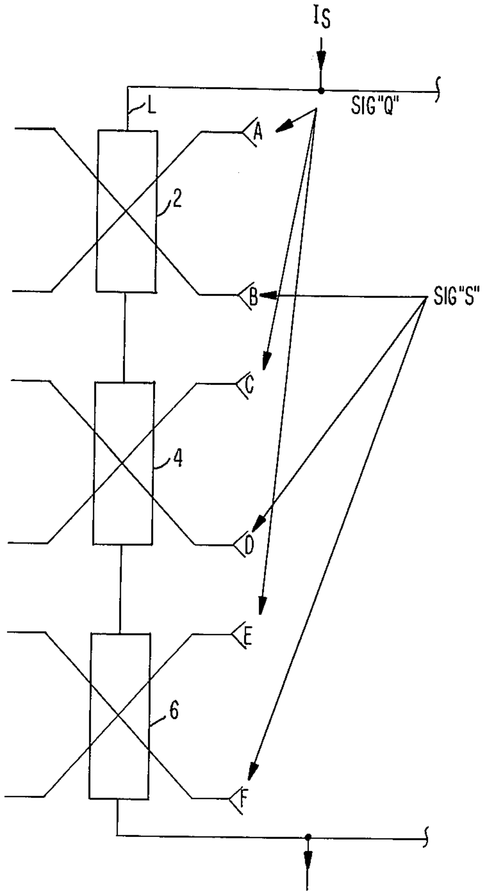
FIGURE 6 is a modification of the invention wherein the superconductor adder is employed for measuring the degree of correlation between two signals.
Figure 7:
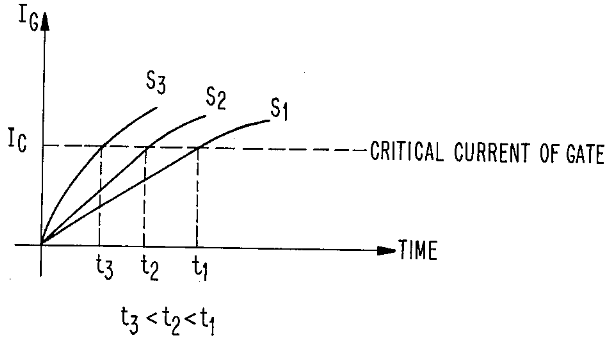
FIGURE 7 is similar to FIGURE 5 but relates to the embodiment shown in FIGURE 6.

FIGURES 6 and 7 relate to that embodiment of the invention utilizing anti-equality function generators instead of equality function generators. Assume signal Q is to be correlated against signals $S_1$, $S_2$ and $S_3$. For signal $S_1$, because pairs of windings 40 and 42, 44 and 46, etc. are wound so that two equal positive or negative amplitude pulses will drive their associated gates 2, 4, etc. resistive and equal but opposite polarity amplitude pulses will maintain the latter superconductive, only one unit of resistance would be switched into the left path L. When signal Q is correlated against signal $S_2$, two units of resistance will be switched, and a comparison of signal Q with signal $S_3$ will result in three units of resistance being switched into left leg L. The switching times for switching $I_s$ current from the left path L to the right path R are shown in FIG. 7. The switching times shown in FIGURE 7 are the reverse of the switching times shown in FIGURE 2 because curve $S_3$ of FIGURE 7 represents high resistance in left leg L corresponding to high signal correlation. In contrast, curve $S_3$ of FIGURE 5 represents a low resistance in the left leg L when there is high signal correlation.

In the practice of the present invention, the staggered time pulses start at the same time that signals are applied to input control lines 40 and 42, 44 and 46, etc. The number of flip-flops 22, 24, 26, etc. which have been set by staggered time pulses $t_1$, $t_2$, $t_3$, etc., as compared to the total number of flip-flops, will indicate the time it took to switch $I_s$ current from the left leg L to the right leg R.

It should be understood that one may obtain the superconductive elements using the process of vapor deposition wherein a thin layer of tin or lead of the order of 10,000 Angstroms thick is deposited on a suitable substrate, followed by a same order thin layer of insulating material such as silicon monoxide, and the control lines 40, 42, etc. would also be placed over the silicon monoxide by vapor deposition techniques. Because of the large number of circuit elements required and the high speeds at which arithmetic operations must be performed to accomplish addition and correlation, the use of superconductive elements seems to lend itself to minimizing the size of such equipment and to increasing the speed of such arithmetic operations. The present superconductive adder circuit is an advance in the technology of computation.

While the invention has been particularly shown and described with reference to preferred embodiments thereof, it will be understood by those skilled in the art that various changes in form and details may be made therein without departing from the spirit and scope of the invention.

What is claimed is:

1. An adder circuit comprising two parallel superconductive paths, a first path including a series of cryotrons each of which includes a gate and a control winding, the second path including a series of AND circuits conditioned by current flowing in said second path, an indicating device coupled to the output circuit of each AND circuit for sensing the appearance of an output at such AND circuit, means for applying current through said control windings so as to drive their respective gates resistive, and means for applying current pulses to said AND circuits, said latter pulses appearing sequentially at each AND circuit.

2. An adder circuit comprising two parallel superconductive paths, a source of current for said parallel paths, a first path including a series of superconductive bistable elements, the second path including a series of AND circuits, means for initially diverting all of said source of current into said first path, means for selectively switching said superconductive bistable elements to their resistive states, whereby current flowing in said first path is caused to transfer to said second path at a speed that is determined by the number of bistable elements switched to their resistive states, a plurality of AND circuits conditioned by current flowing in said second path, an indicating device coupled to the output circuit of each AND circuit for sensing the appearance of an output at each AND circuit; and, means for applying current pulses to said AND circuits, said latter pulses appearing at each AND circuit at different times.

3. An adder circuit comprising two parallel superconductive paths and a current source therefor, a first path including a series of cryotrons and a second path including a series of AND circuits conditioned by current flowing in said second path, means for diverting all of the current from said source to flow only in said first path, an indicating device coupled to the output circuit of each AND circuit for sensing the appearance of an output at each AND circuit, means for driving any number of cryotrons to their resistive states so as to cause all the current in the first path to switch to the second path, means for applying a series of time-distributed pulses to said AND circuits whereby each AND circuit will be coincidentally actuated in accordance with the speed at which current switches from said first path to said second path and the appearance of a time-distributed pulse thereat.

4. Means for ascertaining the correlation of two signals comprising two parallel superconductive paths, a first path including a series of cryotrons each of which includes a gate and two control windings, the second path including a series of AND circuits conditioned by current flowing in said second path, means for initially diverting said current to and maintaining it in said first path only, means for sending said two signals to be correlated through said control windings whereby equality of said signals will cause said control windings to drive its associated cryotron resistive and inequality of said signals will maintain its associated cryotron superconductive, the appearance of resistance in said first path resulting in a switching of the entire current in said first path into said second path and the speed of such switching of current into said second path being a function of the number of cryotrons that are driven resistive, and a series of time-distributed pulses applied in sequence to said AND circuits.

5. Means for ascertaining the correlation of two signals comprising two parallel superconductive paths, the first of said two paths including a series of cryotrons each of which includes a gate and two control windings, the second path including a series of AND circuits conditioned by current flowing in said second path, means for initially diverting said current to and maintaining it in said first path only, means for sending said two signals to be correlated through said control windings whereby a predetermined relationship of the amplitudes of said signals will affect the resistivity of the cryotron associated with such control windings, the appearance of resistance in said first path resulting in a switching of the entire current in said first path into said second path and the speed of such switching of current into said second path being a function of the number of cryotrons that are driven resistive, and a series of time-distributed pulses applied sequentially to said AND circuits.

6. The circuit as defined in claim 5 including means for detecting which AND circuits have been actuated.

7. A circuit of the class described comprising two parallel superconductive paths and a current source therefor, a first path including a series of cryotrons and a second path including a series of AND circuits conditioned by current flowing in said second path, means for diverting all of the current from said source to flow only in said first path, means for driving any number of cryotrons to their resistive states so as to cause all the current in the first path to switch to the second path at a speed that is a function of the number of cryotrons driven to their resistive state; and, means for applying a series of time-distributed pulses to said AND circuits, whereby each AND circuit is actuated when the appearance of a time-distributed pulse thereat coincides with a minimum level reached by the current being switched from said first path to said second path.

References Cited by the Examiner

UNITED STATES PATENTS

| | | | |
|---|---|---|---|
| 2,643,819 | 6/1953 | Lee et al. | 235—181 |
| 2,840,308 | 6/1958 | Van Horne | 235—181 |
| 2,873,914 | 2/1959 | Hebel | 235—168 |
| 2,967,665 | 1/1961 | Einsele et al. | 235—168 |

ROBERT C. BAILEY, *Primary Examiner.*

MALCOLM A. MORRISON, *Examiner.*